Nov. 1, 1966  R. C. BRUSSEE  3,282,757
METHOD OF MAKING A FILAMENT REINFORCED PRESSURE VESSEL
Filed July 7, 1965  3 Sheets-Sheet 1

INVENTOR.
RICHARD C. BRUSSEE
BY Watts & Fisher, attys

INVENTOR.
RICHARD C. BRUSSEE
BY Watts & Fisher, attys.

INVENTOR.
RICHARD C. BRUSSEE
BY Watts & Fisher, attys.

United States Patent Office 3,282,757
Patented Nov. 1, 1966

3,282,757
METHOD OF MAKING A FILAMENT REINFORCED
PRESSURE VESSEL
Richard C. Brussee, Cleveland, Ohio, assignor to
Structural Fibers, Inc.
Filed July 7, 1965, Ser. No. 470,003
11 Claims. (Cl. 156—69)

This application is a continuation-in-part of application Serial No. 244,605, filed December 14, 1962 for "Fiber-Reinforced Plastic Articles and Methods of Production," now abandoned.

This invention relates generally to the manufacture of filament reinforced hollow articles, and more specifically to new and useful improvements in methods of producing such articles.

The invention is particularly concerned with the production of filament reinforced vessels which are desired to have high uniform strength characteristics throughout the vessel walls. Typical of such vessels are both rigid and resilient constructions intended to withstand high, and often cyclic, internal pressures. Pressure vessels of this type include domestic water softener tanks, motor cases, fuel tanks for use in aircraft, missiles and the like, containers for transporting gas such as oxygen and hydrogen, and tanks used as sources of pressurized fluid in various applications. The methods of this invention also are useful in forming resilient inflatable members, such as play balls and the like, having an inner bladder and a filament reinforced outer shell.

The proper construction of a molded filament reinforced pressure vessel requires that all portions of the vessel walls be formed to offer as nearly uniform resistance to the internal pressures as is possible. Otherwise, bending stresses will be created in the walls during use due to the pressure and the vessel will rupture prematurely in the stressed wall portions. The ideal formation is one in which the filament geometry and the curvature of the vessel walls are related to the operative pressure loading so that the filaments are uniformly tensioned throughout every location in the vessel, including its end walls which may be provided with fittings that form fluid ports. The ideal end wall configuration may have a different curvature in different locations in a single vessel and will vary from vessel to vessel depending upon the manner in which the filaments are arranged and initially tensioned, the diameter of the fitting opening in relation to the maximum end wall diameter, and similar considerations.

Many different procedures and apparatus have been evolved in the past in attempts to produce balanced pressure vessels. One common practice involves the winding of reinforcing filaments on a rigid mandrel which either may be collapsed to remove it from the finished vessel or formed of a disposable material, such as salt or a low melting point metal, so that the mandrel can be subsequently destroyed.

The conventional practice of winding on a rigid mandrel has several disadvantages and practical limitations. It is necessary that the mandrel be very accurately formed in order to impart the correct shape to the finished vessel. For example, a typical procedure that has been followed in forming a disposable mandrel involved the steps of calculating the optimum wall shape of each vessel to be constructed and then shaping the mandrel, usually by hand, into the desired configuration. Another more empirical method was to simulate the optimum end wall shape by forming a network of threads on a frame and expanding the threads into a condition of uniform tension. The wall curvature was determined graphically from the expanded netting arrangement and the disposable mandrel was machined in accordance with that determination.

Even though considerable care may be taken in the formation of the mandrel, it was found in practice that errors in shape frequently occurred which resulted in a defective vessel. Another disadvantage of using a disposable mandrel is that a new mandrel must be made for each vessel produced. The production of each mandrel is expensive and time-consuming, and consequently the cost of mandrels has been a major factor in manufacturing expense.

The practice of using a rigid mandrel also requires that the reinforcing filaments be exactly wound on the mandrel under uniform tension, and complicated and expensive winding apparatus have been devised in the past for this purpose. If the filaments are not exactly positioned under uniform tension, the same conditions will be imparted to the finished vessel so that it will not exhibit uniform resistance to internal pressures regardless of the fact that the mandrel itself may have had the correct shape.

When a continuous reinforcing filament is wound between the poles of a mandrel so as to cover its entire surface, at least two overlapped layers of windings are developed. Because of the overlapping windings and because it is difficult, if not impossible, precisely to position each filament pass under uniform tension and to produce an ideally shaped rigid mandrel, the final conditions in the molded vessel usually are such that its end walls tend in use to assume a configuration which varies in curvature in different locations around the periphery of the vessel. As generally explained above, it is essential that the walls of the vessel have a molded configuration conforming to the filament geometry dictated by the winding conditions and mandrel shape in order to eliminate bending moments when the vessel is pressurized in use.

The present invention recognizes that the optimum end wall shape of a pressure vessel will vary in different locations around its periphery, as well as from vessel to vessel, and provides a method of obtaining the correct configuration in each individually formed vessel consistent with the size of any opening, the maximum diameter of the article, and the manner in which the reinforcing filaments are layed up prior to the molding operation. More particularly, the invention contemplates an economical production process in which the end walls of a pressure vessel are shaped during the molding operation so that the contour of the walls and the filament geometry are directly related to the intended pressure loading and so that the filaments are substantially uniformly tensioned throughout every location in the walls of the finished vessel. The practice of the invention does not require that the reinforcing filaments initially be precisely positioned and uniformly tensioned, but achieves the correct filament geometry dictated by the winding conditions and the required uniform tensioning as an inherent aspect of the molding operation itself, whereby bending moments in the walls of the molded vessel are eliminated. Among other advantages, the new and improved technique is carried out without the use of a preformed mandrel and thereby eliminates all of the mandrel-forming problems of the prior art. It also eliminates the need for the complicated and expensive winding apparatus heretofore required to lay up the reinforcing filaments under uniform tension on a mandrel or core.

In general, the invention contemplates the steps of laying up the reinforcing filaments on a distensible bladder. The bladder is made of a stretchable material and is capable of being locally expanded during inflation in the manner of a rubber bag so as to conform to a surrounding shape and transmit uniform pressure proportional to the inflation pressure. The filaments are impregnated with a suitable matrix material and, after being layed up on a bladder, the bladder is inflated to a selected pressure that is proportional to the intended operating pressure of the vessel. At least the end walls of the bladder are allowed to expand free of external restraint except for the filaments so that the filaments may assume a natural contour dictated by the inflation pressure, whereupon the matrix material is cured to form a shell containing the expanded filaments. As will be discussed in more detail, this general technique can be followed in forming constructions such as water softening tanks wherein the end walls are formed on a cylindrical body portion, as well as constructions wherein the end walls are connected to form a rounded body.

The finished vessel is characterized by the fact that the filaments in the end walls are under substantially uniform tension throughout every location even though the stresses will vary in relation to the end wall curvature. This uniform tensioning of the filaments and the resulting uniform resistance to internal pressure is achieved by the pressure loading of the filaments during the molding operation, and the bladder which is used need only have the approximate shape desired in the finished vessel. Thus, the method of this invention does not require precise calculation of the optimum wall shape and the accurate formation of a winding mandrel.

It will also be apparent that the method of the invention eliminates the criticality heretofore required in laying up the filaments by a precise winding operation. The finished shape of the end walls will vary depending upon the arrangement of the filaments. For example, if the filaments are arranged in the manner of conventional polar windings, the end wall configuration will be generally elliptical. However, the filaments can be layed up by hand or by some other economical procedure and the individual filaments need not be initially under uniform tension. As explained above, this is accomplished by the subsequent expansion of the bladder.

This method of pressurizing the filaments to obtain a natural expanded filament geometry is distinguished from the conventional practice of pressurizing a metal liner or shell in an attempt to pre-stress the filaments. In accordance with that practice, the shell was pressurized within the elastic limit of the metal. Since the metal shell inherently expanded uniformly within its elastic limit, as distinguished from the local, freely expanding characteristics of a distensible bladder, it was not possible to utilize the expansion forces to tension the filaments uniformly. Hence, it was still required accurately to form the liner to the desired configuration and carefully to lay up the filaments on the liner under uniform tension conditions. All of these disadvantages are avoided by the present invention.

Other features and advantages of the invention will become apparent from the following detailed description taken in conjunction with the accompanying drawings in which.

As generally described above, the invention entails the steps of laying up a plurality of reinforcing filaments on a distensible bladder and applying a suitable material which is capable of forming a surrounding matrix that bonds the filaments together into either a rigid or resilient shell. As used throughout the following specification and claims, the term "strand" is intended to include individual filaments of any shape, as well as rovings, flat bands, ribbons and the like which may be made up either as integral members or of a plurality of filaments. Such filaments may be continuous and extend from one end of the bladder to the other or they may be provided in individual lengths which are secured to each end of the bladder. Glass fibers are the preferred reinforcing material, although the invention also contemplates the use of other conventional filamentary reinforcing material, including fibers of various types, cords, wires and the like. Vessels having flexible walls may be formed using flexible strands that possess the desired strength characteristics.

The structural strength in the finished vessel is primarily afforded by the reinforcing strands. Hence, the matrix material may be any suitable material that can be used to fill the spaces between the strands and hold the strands in position. The preferred matrix material is a settable resin and especially a suitable thermosetting resin such as an epoxy, the time and temperature of which can be controlled in the usual manner by employing suitable setting agents. It is also contemplated that the matrix can be formed of rubber, either natural or synthetic, as well as other elastomers which will produce either a rigid or flexible outer shell.

Figure 1:
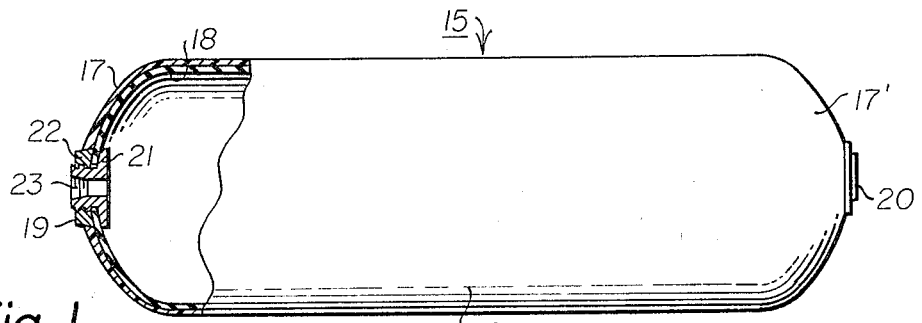
FIGURE 1 is a side elevational view, partially in cross-section, of a typical, filament reinforced, plastic pressure vessel constructed in accordance with the present invention.

Referring now to the drawings, and to FIG. 1 in particular, there is shown a closed end, cylindrical pressure tank 15, such as a water softening tank which is normally subjected to repeated pressure cycling when in use. It is to be understood that this specific tank formation is not limiting of the invention and that it has been chosen only for the purpose of illustrating one practical application of the novel process of this invention. As described below, the invention has utility in the formation of reinforced plastic vessels of various shapes and for a variety of purposes.

The tank 15 comprises a cylindrical body portion 16 and end domes 17, 17'. The walls of the tank are formed by reinforcing strands which are arranged in a manner to be more specifically described to afford the required longitudinal and hoop strength. The strands are preferably bonded together by the matrix material to form a coherent outer shell. A distensible bladder 18 is disposed within the outer shell and serves to prevent leakage of fluid through the walls of the tank when in use.

As illustrated, each end dome 17, 17' has an ideal shape which is symmetrical and semi-elliptical in cross-sectional configuration. This ideal shape is to a large extent theoretical and would result only if the reinforcing strands were precisely positioned and wound on the bladder under uniform tension. In actual practice, the configuration of each end dome 17, 17' may vary around the periphery of the cylindrical body portion 16 because of the difficulties involved in the winding operation.

Figure 6:
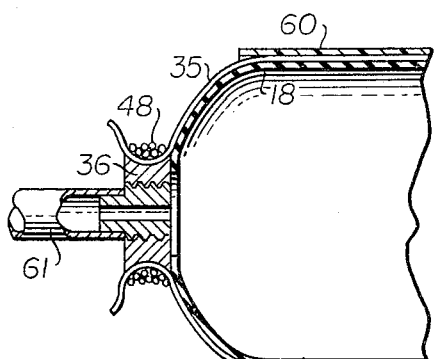
FIGURE 6 is a cross-sectional view of one end portion of a pressure vessel formed in accordance with the steps of FIGS. 3–5.

End fittings 19, 20 are respectively provided in the end domes 17, 17'. The end fitting 19 may comprise a tubular member which is mounted in an opening in the end of the bladder 18. As shown, the fitting 19 has an inner flange 21 and the bladder 18 is clamped between the flange and a ring 22 which is mounted around the fitting. The fitting also has a threaded inner surface 23 adapted to engage a pressure conduit (FIG. 6). Alternatively, the bladder 18 may be formed with an integral, tubular neck (not shown) adapted to extend axially outwardly through the fitting 19 and to be connected to a suitable fluid source. The fitting 20 is preferably a blind fitting and may be connected to the bladder in the same manner as member 19.

In accordance with the invention, the bladder 18 is formed of a material capable of being stretched and locally expanded during inflation so as to conform to a surrounding shape and transmit expansion forces proportional to the inflation pressure. In the embodiment shown in FIG. 1, the bladder 18 is formed of a molded thermoplastic material, such as polyethylene. Thus formed, the bladder can be heated to the softening point of the plastic and then inflated so that the bladder will assume an expanded shape without inducing permanent stresses in the bladder material. A plastic bladder of the type described is ideally suited for the purposes of the present invention, since it is also capable of being cooled after inflation and worked within the modulus of the reinforcing strands without exceeding the elastic limit of the plastic. It is also possible to form the bladder 18 of rubber or the like and to inflate the bladder under a slight pressure preparatory to laying up the reinforcing strands so that it has the general shape illustrated in FIG. 1.

Figure 2:
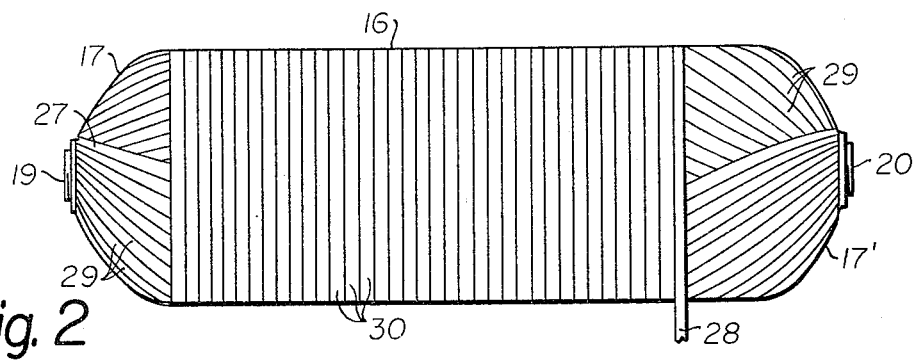
FIGURE 2 is a view diagrammatically illustrating one way in which the reinforcing filaments may be arranged in forming the pressure vessel of FIG. 1.

Referring now to FIG. 2, there is shown a conventional winding arrangement which may be employed in constructing the tank 15. The illustrated winding pattern is generated by a continuous strand 27 which is laid down on a normally small helix angle to form a succession of near geodetic loops 29 extending from one end fitting 19 to a corresponding location at the opposite end fitting 20. The lengthwise passes of the strand 27 are preferably laid down side-by-side completely to envelope the bladder 18 and, as well understood in the art, provide the necessary end strength requirements of the tank. The circumferential or hoop strength required in the cylindrical body portion 16 is afforded by "level" windings which may be laid down over the helical winding 29 to extend between the locations where the end domes 17, 17' become tangent to the cylindrical body portion. The "level" windings are generated by a strand 28 which is wound at a small helix angle relative to a plane perpendicular to the longitudinal axis of the tank.

The first step in forming the tank 15 is to provide a distensible bladder 18 having the characteristics described above. The helical windings, designated by reference numeral 29 in FIG. 2, are then applied to the bladder over its outer surface by wrapping the strand 27 endwise of the bladder in the manner shown. Each lengthwise pass of the strand 27 is laid down tangent to the fittings 19, 20 and is positioned adjacent the previous pass until the outer surface of the bladder is completely covered. Preferably, the strand 27 is in the form of tape or ribbon in order to prevent a build-up of the windings 29 where they become tangent to the end fittings. The number of longitudinal passes and the spacing between adjacent passes is, of course, determined by the end strength requirements of the particular vessel being formed. However, it will be apparent that at least two layers of the windings 29 will be formed in completely surrounding the bladder.

After the helical windings 29 have been laid down, the level windings 30 (FIG. 2) are applied by wrapping the strand 28 around the cylindrical portion of the bladder 18. The number and spacing of the level windings is determined by the hoop strength required in the particular vessel being produced.

In carrying out the process, the strands 27, 28 can be preimpregnated with a suitable settable resin or other matrix material before being laid on the bladder 18. Alternatively, the strands can be impregnated at the same time they are laid up on the bladder by drawing them through a liquid resin bath (not shown) or the resin can be applied after the windings 29, 30 have been formed.

As pointed out above, conventional practices utilizing either a rigid mandrel or a uniformly expandible metal liner as a winding form require the filaments in the end walls to be initially arranged on the winding form under uniform tension. This necessitated complicated winding apparatus in order that all of the filaments would be uniformly tensioned in the final product. An important advantage of the present invention is that it is not necessary to apply the helical windings 29 to the bladder under uniform tension. It is possible, for example, to apply these windings by hand and to tension the strands only to the extent that the windings will not slip during the winding operation and subsequent handling.

The helical windings 29 forming the end domes 17, 17' are uniformly tensioned by the simple expedient of inflating the bladder 18 after the winding operation has been completed and allowing the bladder end walls to expand free from external restraint except for the end windings. During this expansion of the bladder, the windings 29 may move lengthwise and the end domes will be observed to change shape until they have assumed a natural, expanded contour consistent with the diameter of the end fittings, the maximum diameter of the bladder, the positioning of the windings and the initial tensioning of the winding. It is this balloon-like, unrestrained expansion of the bladder and walls which uniformly tensions the strands and achieves the desired maximum structural strength and uniform resistance to internal pressure in the finished vessel.

The inflation pressure required to tension the windings 29 uniformly and cause the end walls to assume a natural geometry that results in maximum structural efficiency depends upon the bladder material, the end wall thickness of the strands and matrix material, the particular materials which are used and the size of the vessel. In typical applications utilizing plastic bladders, an inflation pressure up to 85 p.s.i. usually has been found sufficient to produce the desired results.

When using a thermoplastic bladder, as described above, it is preferred to heat the bladder to at least the softening point of the plastic, for example, to a temperature around 200° F., when it is inflated. This may be done by placing the bladder in a furnace or by using steam or a heated liquid as the inflating medium. The softened plastic liner acts as a seal for the pressurizing fluid and is capable of freely expanding to a new shape without limiting the expansion and adjustment of the windings 29 to a condition of uniform tension. Further, if the plastic bladder is softened when it is inflated, the initial shape of a plastic bladder is not critical, since it is capable of freely expanding to the desired shape without inducing permanent stresses in the bladder material and without necking or cracking the plastic.

Once the bladder 18 has been pressurized to expand the filament windings 29 in the manner described, the resin or other matrix material is cured, such as by subjecting the entire assembly to heat, while the bladder is maintained in its inflated condition.

It will be apparent from the foregoing that the inflation of the bladder automatically obtains the optimum end wall shape for the particular vessel being produced and affects substantially uniform tensioning of the windings 29 in all locations. This desired result is achieved without the need of calculating the optimum end wall shape, forming a mandrel and laying up the strands under an initial condition of uniform tension, and the finished vessel is characterized by maximum structural strength and uniform resistance to internal pressures. These characteristics are obtained regardless of the position of the fittings 19, 20 in the end walls of the vessel. Thus, while the fittings 19, 20 have been shown as being located at the poles of the bladder end walls, it is entirely possible to locate the fittings in positions off-set from the longitudinal axis of the bladder and to expand the end walls in order uniformly to tension the strands, as described above.

In carrying out the process, two layers of the windings 29 are formed by covering the bladder 18. The end strength afforded by these windings is sufficient for many applications. However, certain structures designed for very high burst strengths may require additional layers of helical windings. In such instances, it is preferred to form a shell in the manner described above and then to use the shell as a winding form on which the additional layers of windings are arranged. The expansion of the bladder during formation of the shell achieves a shape in which the windings are uniformly tensioned. Thus, by laying up additional windings on the shell under uniform tension, it is possible to produce a finished vessel having high strength characteristics.

A specific example of the preferred process of this invention is as follows:

A plastic bladder was formed by rotational casting in a metal mold 12 inches long and six inches in diameter. The bladder was made of low density polyethylene powder and was cast at a temperature of approximately 400° F. The average wall thickness of the bladder was approximately .100 inch. After the bladder was formed, a two inch outside diameter flange fitting was inserted in one end and a blind fitting of the same diameter was secured to the opposite end.

Prepregnated, sixty end glass fiber roving was used as the reinforcing material. The lengthwise extending strands were wound by hand on the bladder in a helical pattern between the end fittings. The circumferential lay of strands was wound over the lengthwise strands on a pitch of twenty-eight winds per inch. The resin used to preimpregnate the glass prior to winding was a general purpose polyester resin catalyzed with one percent benzoyl peroxide.

After the glass rovings had been wound on the bladder, the bladder was pressurized by air to 2 p.s.i. gauge and the assembly was placed in an oven and heated for approximately five minutes at a temperature of about 200° F. in order to soften the bladder. The pressure was then increased to 40 p.s.i. and the resin was allowed to cure at the 200° F. temperature for approximately 35 minutes to complete the vessel. The finished vessel had an all-over size of six inches in diameter and 12½ inches in length. Burst tests were conducted until the vessel finally failed in its cylindrical wall at a pressure of 1800 p.s.i.

Figure 3:
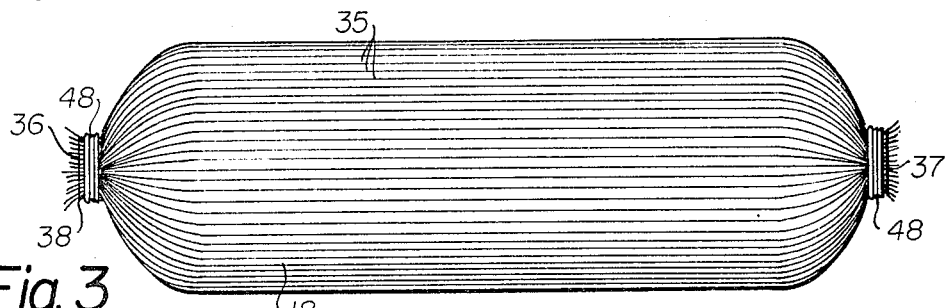
FIGURE 3 is a side elevational view diagrammatically illustrating a partially formed vessel embodying a modified arrangement of longitudinally extending filaments.

It is understood that the particular arrangement of the reinforcing filaments illustrated in FIG. 2 and the manner of applying the filament windings to the bladder is not limiting of the broader aspects of the invention. For example, there is shown in FIG. 3 an alternate winding pattern comprising a plurality of strands 35 which are oriented around the bladder 18 in relatively uniform lengths parallel to its longitudinal axis. The lay of the strands 35 over the bladder end walls is substantially on lines radiating from the poles and may be described as extending along meridional lines between diametrically opposed end fittings 36, 37. Each of these end fittings 36, 37 has an outer circumferential groove 38 and is secured to the bladder in any suitable manner, such as by cementing, vulcanizing or the like.

Figure 4:
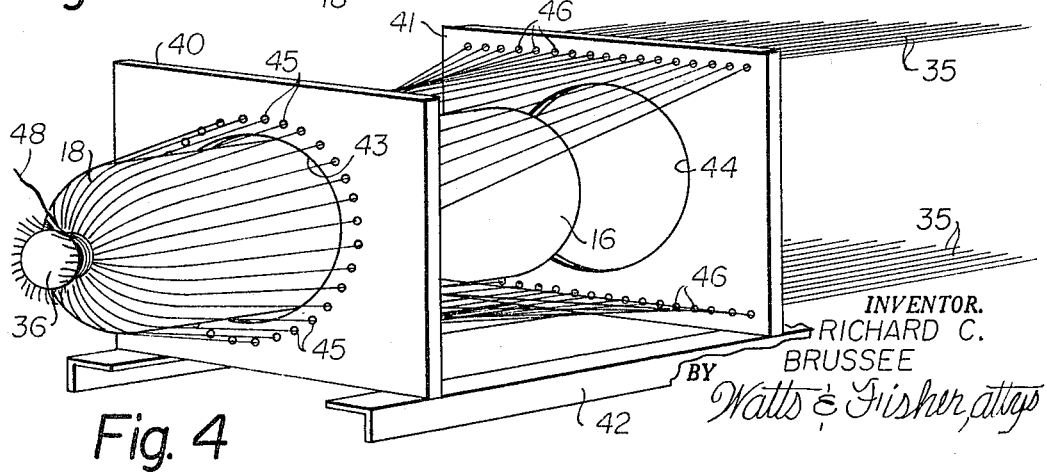
FIGURE 4 is a view diagrammatically illustrating a procedure of arranging the longitudinal filaments in the modified pattern of FIG. 3.

Referring now to FIG. 4, there is shown an apparatus useful for applying the meridional lay of strands 35 on the bladder 18. The apparatus is shown to include spaced, parallel guide plates or panels 40, 41 which are secured to either a stationary or longitudinally reciprocal frame 42. The plates 40, 41 are provided with aligned holes 43, 44 respectively, which are slightly larger in diameter than the initial diameter of the cylindrical bladder portion 16. A plurality of guide apertures 45 are formed through the plate 40 around the hole 43. The plate 41 is provided with a plurality of guide apertures 46 corresponding in number to the apertures 45. As shown, the apertures 46 are arranged in two rows on opposite sides of the hole 44 so that the strands extending through the apertures of one row can be received through the apertures 45 located around one-half of the hole 43. The reinforcing strands 35 which extend through the several apertures 45, 46 are supplied from a suitable source (not shown) located beyond the plate 41.

In use the free ends of the several reinforcing strands 35 may be drawn through the apertures 45 of the plate 40 and knotted together to form a closed network of strands. The bladder 18 is then moved partially through the hole 43 to the position generally shown in FIG. 4 so that the end of the bladder containing the fitting 36 is within the network of strands. When the bladder is in this position, the strands 35 are secured to the fitting 36 by means of a binding strand or wire 48 which is wrapped around the strands in the groove 38. The bladder is then moved completely through the hole 43 of the guide plate 40 and another binding strand 48 is tightly wrapped around the strands to pull them down on the fitting 37 (FIG. 3). The strands may be fed through the apertures of the guide plates and applied to the bladder with light tension. The tension level that is required need only be sufficient to prevent the windings from slipping from the bladder.

While only one pass of the meridional strands 35 has been illustrated on the bladder 18, any number of passes or layers can be made in order to obtain the desired strength. To accomplish this, the bladder may be moved back and forth through the guide plates 40, 41 to double each strand on itself the required number of times. At the end of each pass, the strands are tied to one of the end fittings 36 or 37 in the same manner described above. Further, the number of strands which are laid up, as well as the orientation or spacing around the bladder, can be varied to suit the strength requirements and construction of any particular vessel shape by simply selecting the appropriate arrangement of guide apertures through which the strands are extended.

As in the process described in conjunction with FIG. 2, the strands 35 can be impregnated with a suitable matrix material, such as resin, at the time when they are laid up on the bladder 18. This can be done conveniently in accordance with conventional procedures by drawing the strands through a liquid resin bath (not shown). Alternately, the strands can be impregnated either before or after they are applied to the bladder.

Figure 5:
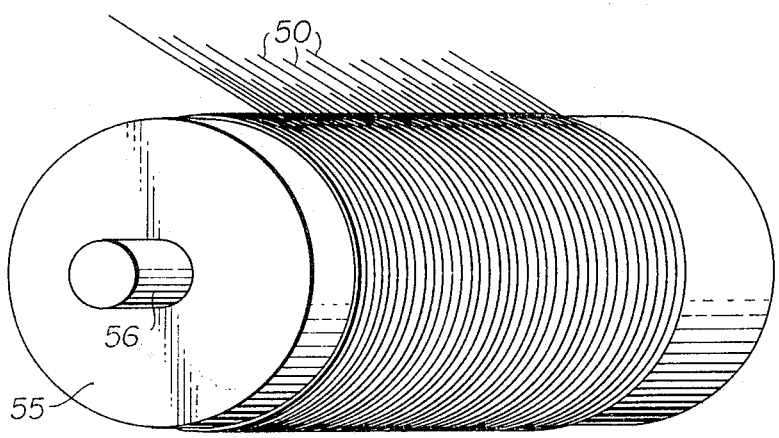
FIGURE 5 is a view diagrammatically illustrating a subsequent step in the production of a vessel embodying the filament pattern shown in FIG. 3.

Circumferential strands 50 are provided around the cylindrical wall portion 16 of the bladder 18 in order to impart the desired hoop strength in the molded vessel. These circumferential windings may be provided in the form of a separate shell or sleeve. Such a shell may be made in the manner illustrated in FIG. 5 by hoop winding a plurality of separate reinforcing strands 50 on a mandrel 55 which is rotated on a spindle 56 by any suitable means. In accordance with known winding techniques, the several strands 50 may be fed to the mandrel 55 through rollers, guides or the like (not shown) to uniformly tension the strands and the mandrel rotated the number of turns necessary to produce a cylindrical shell having a calculated hoop strength. By feeding additional strands to the mandrel through selected guides, any given wall area of the shell or sleeve can be wound to a desired thickness.

In an alternative procedure, a continuous strand may be hoop wound on the mandrel 55 by a conventional longitudinal feeding wherein a filament guide traverses the length of a rotation mandrel. It is also possible to wind either the several strands 50 or a single continuous strand directly on the cylindrical wall portion 16 of the bladder over the strands 35.

The matrix material, such as resin, is applied to the strands 50 before, during or after winding on the mandrel 55. When the winding operation has been completed, the resin is preferably cured and the mandrel removed from the completed shell or sleeve 60.

In the final stage of the process, the pre-cured hoop wound sleeve 60 (FIG. 6) is telescoped over the bladder 18 and the meridional strands 35. The length of the sleeve or shell 60 is preferably such that its end portions 60a (only one of which is shown) extend beyond the areas in which the bladder end walls become tangent to the cylindrical portion 16 when the bladder is inflated. The fluid conduit assembly 61 is then connected to the end fitting 36 and a suitable pressurizing fluid, such as air or steam, is introduced into the bladder.

Inflation of the bladder 18 causes the strands 35 to move lengthwise beneath the shell 60 and the end walls of the bladder to assume a naturally expanded contour in which all of the strands are uniformly tensioned to provide maximum structural strength. As previously described, the bladder 18 is preferably heated when inflated to at least the softening point of the plastic so that it is capable of freely expanding without necking or cracking the plastic. After the resin or other matrix material has set, the end portions 60a of the shell 60 may be trimmed away and the exposed ends of the strands 35 cut off.

Figure 7:
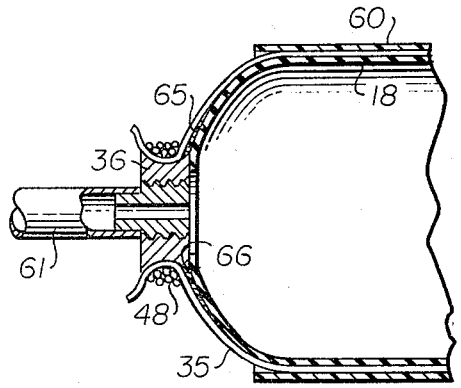
FIGURE 7 is a fragmentary, cross-sectional view of a modified vessel construction.

In FIG. 7 there is shown a modified structure which includes generally cup-shaped end pads 65 (only one of which is shown) mounted over the ends of the bladder 18. These end pads are formed of a suitable reinforcing material so that, when they are wetted with resin and the resin cured, transverse tie strength will be provided in the end areas of the molded tank to prevent bulging of the bladder between the strands.

The pad 65 is provided with a central hole 66 so that it can be mounted around the bladder end fitting 36. The pad at the other end of the liner (not shown) is similarly shaped and is mounted around the end fitting. Both pads may be preformed in any conventional manner, such as by distributing chopped glass fibers on a cup-shaped screen and lightly bonding the fibers with resin. The pads may be thoroughly wetted with resin before or after they are applied to the ends of the liner.

Figure 8:
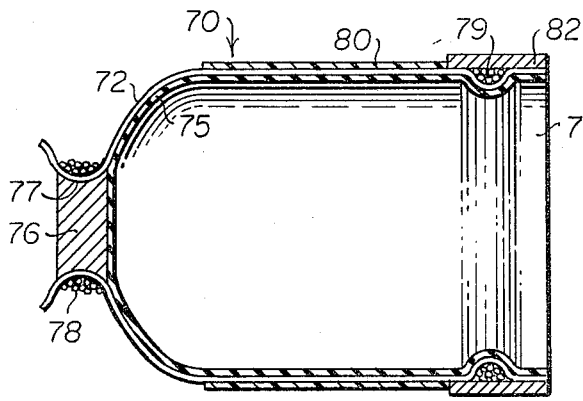
FIGURE 8 is a cross-sectional view of still another vessel produced in accordance wtih this invention.

It will be clear to those skilled in the art that the procedures described herein lend themselves to the production of various shapes of tanks and other articles. For example, FIG. 8 illustrates the formation of a vessel 70 having an open end 71 and a closed, dome-shaped end 72. In forming the vessel, an expansible bladder 75 is used which may correspond to the previously described bladder 18. An end fitting 76 is secured to one end of the bladder, while the opposite end (not shown) is preferably provided with a conduit that may be connected to a fluid source under pressure.

Longitudinal reinforcing strands 77 are applied to the bladder 75 in generally the same manner discussed above in connection with FIGS. 3 and 4. Thus, the strands are tied to the fitting 76 by a cord or wire 78 and the bladder is moved partially through the guide panel 40. When in this position, a cord or wire 79 is wrapped circumferentially around the bladder to secure the strands 77 in their longitudinally extending arrangement. A hoop wound shell 80 formed in the manner of the previously discussed shell 60 is then telescoped over the bladder 75 and the bladder inflated while confining its exposed end portion to obtain uniform strand tension and the proper curvature of the end wall 72. If desired, a rim 82 formed of metal, plastic or other suitable material also may be mounted around the bladder to serve as a means for securing a cover (not shown) over the open end of the formed vessel. These same procedures may be followed in forming conical vessels.

Figure 9:
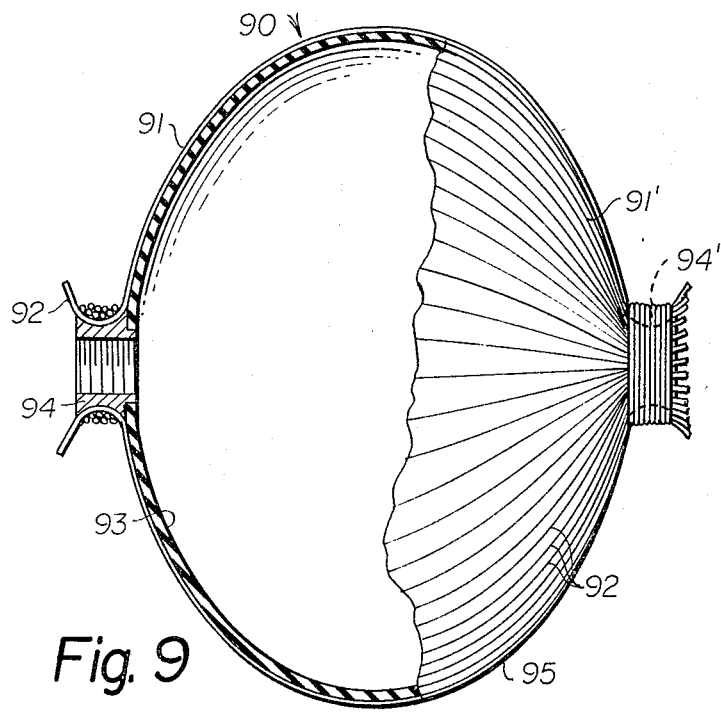
FIGURE 9 is a diagrammatic view, partially in cross-section of still another vessel structure; and, FIGURE 10 is a diagrammatic view, partially in cross-section, of yet another vessel structure.

FIGURE 9 illustrates the formation of a rounded pressure vessel 90 comprised of ellipsoidal end walls 91, 91' which are similar in shape to the end domes 17, 17' of the previously described vessel 15 and are joined together without an intermediate cylindrical body portion. The illustrated structure is known as a "Bermuda" type vessel and embodies a construction based on geodesic principles which, as in the other embodiments, affords optimum resistance to pressure loading.

As shown, the reinforcing strands 92 of the Bermuda vessel 90 are laid down in a meridional winding pattern similar to that described in conjunction with the vessel of FIG. 3. The several reinforcing strands 92 surround a distensible bladder 93 and are secured at either end of the vessel to end fittings 94, 94'. As in the other described vessels, the strands are embedded in a suitable matrix material, such as an epoxy resin or the like, to form an outer shell 95.

The distensible bladder 93 has an initial, generally elliptical shape and the same characteristics as the bladder 18 of FIG. 1. In producing the vessel 90, a suitable number of the reinforcing strands 92 calculated to impart the required strength are laid up around the bladder and are tied to the end fittings 94, 94'. The strands need not be precisely positioned and the initial tensioning need only be sufficient to prevent the strands from slipping from the bladder. The bladder is then pressured to cause the strands to assume the naturally expanded configuration shown in FIG. 9 and place them under uniform tension in every location in the walls 91, 91'. The matrix material is subsequently treated, as by the application of heat, while the bladder is inflated to form the outer shell 95.

Figure 10:
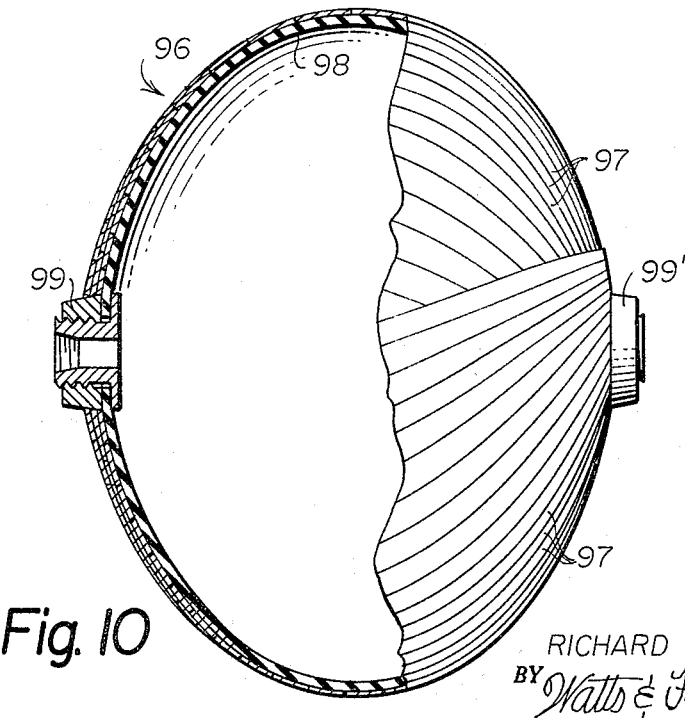

FIGURE 10 illustrates another Bermuda type vessel 96 which is similar to the vessel 90 except that the reinforcing strands 97 are laid down in a helical polar wind similar to the windings 29 in the vessel 15. In forming the vessel 96, the strands 97 are wound over a distensible bladder 98 on a helix angle relative to the polar axis of the vessel and are carried over the end walls tangent to the fittings 99, 99'. Preferably, the strands are in the form of flat ribbons or tapes to avoid a build-up of the reinforcing material adjacent the fittings. The winding operation may be carried out by hand and, after it has been completed, the bladder 98 is pressurized to cause the strands to assume a naturally expanded contour such that they are loaded in proportion to the inflation pressure and are uniformly tensioned in every location. In the final stage of the process, the matrix material used to impregnate the reinforcing strands is treated, as by curing, while the bladder is inflated.

While various vessel shapes and winding patterns have been described, it will be understood that the essence of the invention resides in the concept of providing a distensible bladder of an elastomeric material, such as plastic or rubber, which is stretchable, capable of being locally expanded during inflation and of transmitting uniform pressure proportional to the inflation pressure, laying up reinforcing strands around the bladder, pressurizing the bladder to tension all of the strands uniformly in all locations, and finally treating the matrix material while the bladder is inflated to form a surrounding shell. This preferred process achieves a finished vessel which affords optimum structural strength and does not require either the expensive rigid mandrels or complicated winding apparatus of the prior art.

Many modifications and variations of the invention will be apparent to those skilled in the art in the light of the foregoing detailed disclosure. Therefore, it is to be understood that, within the scope of the appended claims, the invention can be practiced otherwise than as specifically shown and described.

What is claimed is:

1. A method of producing a pressure vessel comprising:
    (a) providing a distensible bladder formed of a stretchable elastomeric material capable of being locally expanded during inflation,
    (b) surrounding said bladder with reinforcing strand windings impregnated with a heat curable material,
    (c) inflating and expanding said bladder,
        (i) free of external restraint except for said windings, (ii) with sufficient pressure to cause each of said windings to be substantially uniformly tensioned, (d) and heating the wound bladder while inflated to cure the impregnating material and form a vessel wall containing said windings.

2. The method as claimed in claim 1 wherein said bladder is formed of rubber.

3. The method as claimed in claim 1 wherein said bladder has end walls and a fitting in at least one wall providing a fluid port, and wherein at least some of the windings on said bladder are adjacent said fitting in said one end wall and extend to a substantially diametrically opposed zone in the other end wll.

4. The method as claimed in claim 1 wherein said bladder is formed of a thermoplastic material, and wherein the inflated bladder is heated during curing to at least the softening point of said thermoplastic material.

5. The method as claimed in claim 4 wherein said windings are formed of glass fiber strands, and wherein the material impregnating said windings is resin.

6. The method of claim 3 wherein the windings on to said bladder extending between said end walls are in the form of continuous filaments applied along lines which are at a helix angle to the axis of said bladder between said fitting and said opposite zone.

7. The method of claim 3 wherein the windings on said bladder extending between said end walls are applied along substantially meridional lines from said fitting to said diametrically opposed zone.

8. The method of claim 3 wherein said bladder has a cylindrical wall connecting said end walls; and wherein said cylindrical wall is surrounded with hoop windings of reinforcing material.

9. The method of claim 5 wherein said bladder is formed with end walls and a fitting in at least one wall providing a fluid port, and wherein said windings are layed up in the form of polar windings extending from said fitting to a diametrically opposed zone in the opposite wall.

10. A method comprising:

(a) providing a distensible bladder having end walls, a cylindrical body portion and a fitting on at least one end wall, at least said end walls being formed of a stretchable, elastomeric material capable of being locally expanded during inflation, (b) surrounding said bladder with resin impregnated, meridional windings of reinforcing strands, said strands being secured to said fitting and to the end wall opposite said fitting, (c) placing hoop windings of reinforcing material around said cylindrical body portion, (d) inflating and expanding said bladder,
   (i) free of external restraint except for said windings,
   (ii) with sufficient pressure to cause each of said windings over said end walls to be substantially uniformly tensioned, (e) and heating the wound bladder while inflated to cure the resin and form a vessel wall containing said windings.

11. The method of claim 10 wherein said hoop windings are placed around said body portion by forming a cylinder of bonded, hoop windings, and telescoping said cylinder over said bladder prior to inflation.

References Cited by the Examiner

UNITED STATES PATENTS

| | | | |
|---|---|---|---|
| 2,794,481 | 6/1957 | Anderson | 156—163 |
| 2,862,541 | 12/1958 | Brink | 156—180 XR |
| 3,047,191 | 7/1962 | Young. | |
| 3,100,171 | 8/1963 | Hardesty | 156—172 XR |
| 3,210,228 | 10/1965 | Bluck | 156—172 |

EARL M. BERGERT, *Primary Examiner.*

P. DIER, *Assistant Examiner.*